United States Patent Office.

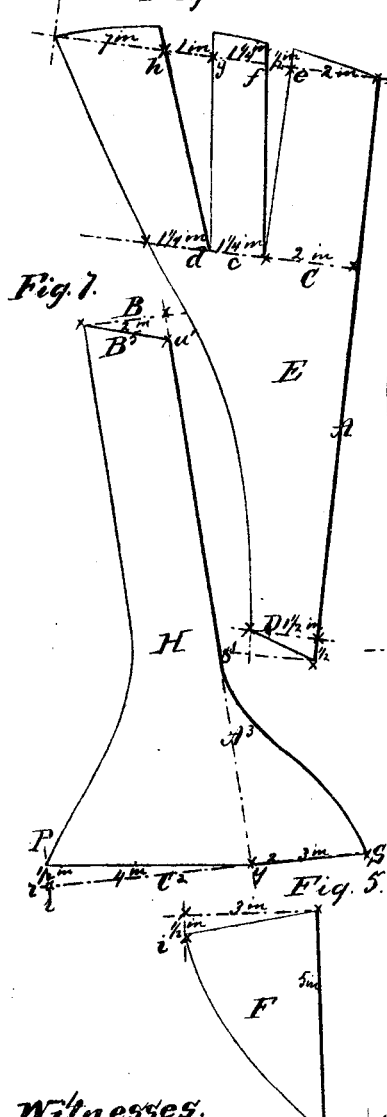

MOLLIE WILLIAMS, OF CAMDEN, OHIO.

Letters Patent No. 101,337, dated March 29, 1870.

IMPROVEMENT IN DEVICES FOR MEASURING, LAYING OUT, AND FORMING CORSETS.

The Schedule referred to in these Letters Patent and making part of the same

*To all whom it may concern:*

Be it known that I, MOLLIE WILLIAMS, of Camden, in the county of Preble and State of Ohio, have invented a new and improved Method of Forming Corsets; and I do hereby declare that the following is a full, clear, and exact description of the construction and operation of the same, reference being had to the accompanying drawings forming part of this specification.

This invention relates to a new method of measuring and shaping the pieces of cloth requisite for a well-fitting corset, with the aid of but four measurements; and it consists First, of three tools or implements, whose edges are so shaped that they will, after the requisite measurements have been obtained, give the requisite curves to the several pieces; and Secondly, in the general system of applying the different measures and of forming the several pieces, as hereinafter more fully described.

The implements are illustrated in

Figures 1, 2, and 3, and are respectively marked No. 1, No. 2, and No. 3.

No. 1 has two straight edges, *a* and *b*, set at right angles to each other, and a scale of inches is laid out on them, as shown in fig. 1.

The other edges, as well as those of Nos. 2 and 3, are curved in accordance with the edges to be formed on the several pieces of the corset.

The four measurements to be ascertained are—

First, around the waist;
Second, length of front;
Third, length of back; and
Fourth, width of chest.

The main pieces E for the front are first laid out, the cloth being doubled to produce the duplicate corresponding parts.

The length of front found, (second measure,) is first measure on the folded edge of the cloth, by the rule No. 1, to give the length of the line A in fig. 4.

The line B is then drawn at the upper end of A, at right angles to the same, and on it one for a person whose aforesaid measurements are respectively 22, 13, 14, and 20 inches, laid out the distance of 2, ½, 1, ¼, 1 and 7 inches, as indicated in the diagram, to determine the points of and the width of openings to admit gores F, which are required to give fulness to this portion of the garment.

The length of four (4) inches is then laid out on the line A, and a line, C, parallel to B, is drawn, and on it are laid out the measurements of 2, 1¼, as shown, to determine the position of the terminating points of the gore openings.

The method of determining these distances will be hereinafter indicated.

The front points, *c* and *d*, found on the line C, are then connected respectively with the points *e f* and *g h*, on B, and the triangular pieces formed between them are cut out to form openings to admit the gores.

A distance of half an inch is then measured up on A, from the lower point, and a line, D, drawn parallel to B, its length being one and a half inch.

The inner end of D is then connected with the upper end of A, and with the inner ends of C and B, as shown, the edges *a* and P, of pattern No. 1, being used for the purpose.

The upper end of line A and the outer end of line B are connected by a curved line, as shown, and thus the front pieces E, there being two in all, are produced.

The gores F are formed by laying out a right angle, whose sides are respectively five and three inches, and by forming a right angle on the inner end of the three inch line, whose length is one-half inch, and determines the point *i*, which is connected with the lower end of the five-inch line, by a convex line, *x*, the upper inner edge *s*, of rule No. 1, being used for the purpose.

The lower edge of this gore is formed by a straight line connecting the point *i* with the lower end of the five-inch line.

The pieces G, which are attached to the sides of the front pieces E, are laid out as follows:

A straight line, $A^1$, as long as the line A, of E, between B and D, is laid out between the points $x'$ and $y^1$, Figure 6, and prolong beyond $y^1$ one and three quarter inch. The line A is prolonged upward half an inch, and a line, $B^1$, two inches long, drawn at right angles to the same, the line $C^1$, described on the point $y^1$, at right angles to $A^1$, is made three inches long, and has its outer end, *z*, connected with the upper end *v*, of the line $A^2$, as shown. The curvature of this line is determined by the back of No. 2.

To complete the piece G, a line $B^3$ is drawn between the point *z* and the lower termination of the line $A^1$ and the line $B^4$ to connect the points *v* and *u*.

To form the piece I the line $B^1$ is prolonged half an inch, and the line $C^1$ the same distance.

A line is then measured up from the outer extremity of $C^1$ a distance of two inches, which determines the point to be connected with $y^1$, by a straight line, and with the outer end of line $B^1$ by a curved line similar to $A^2$. The opposite side is formed or determined by the line $A^1$, and the upper end by the line $B^4$ prolonged.

I is the back piece, corresponding in position to that of G in the front of the corset.

The side piece H, shown in Figure 7, is made as follows:

A line, $A^3$, is laid out as long as that in G, between $x'$ and $y'$, and a line, $B^5$, is also formed at its upper end as long, and at the same inclination, as $B^4$ in G. The line $C^2$ extends from both sides of this line $A^3$, and one of its ends projects three (3) inches from $y^2$ to the point S, and is, by an ogee line, connected with about the middle portion $S'$ of $A^3$. The other end extends from $A^3$ four (4) inches, and at its end $r$ a distance of one-half ($\frac{1}{2}$) inch is measured up to find the point $p$. This point is connected by a straight line with $y^2$, and by an oblique line and final curve with the straight line drawn from $u'$. The curvature of the line $S u'$ is determined by the "front" of pattern No. 2, while the "front" of No. 3 will define the line on the opposite side.

The curves on the implements may be varied on them, that is to say, the piece No. 1 may have the curves now represented on No. 2 or 3, or *vice versa*.

With respect to the measurements on the upper end of the piece E, I have adopted the width of chest of the person to be fitted as the basis upon which to determine the number of the corset. I have found that for a No. 20 corset, that 2, $\frac{1}{2}$, $1\frac{1}{4}$, 1, and 7 inches are the correct distances to be measured off on the upper end of piece E. If the width of chest be one (1) inch more, that is, requiring a No. 21 corset, I add one-eighth of an inch in width to each of the four pieces E, G, H, and I, on each side of the front.

The corset complete, with the several pieces properly adjusted, is shown at Figure 8.

Having thus described my invention,

What I claim as new, and desire to secure by Letters Patent, is—

Measuring, laying out, and forming the several pieces of a corset, by means of patterns Nos. 1, 2, 3, substantially as herein shown and described.

Miss MOLLIE WILLIAMS.

Witnesses:
 Mary Rohrer,
 Miar Williams.